United States Patent Office 3,385,827
Patented May 28, 1968

3,385,827
TRIOXANE TERPOLYMERS
Edgar Fischer, Frankfurt am Main, and Claus Schott, Hofheim, Taunus, Germany, assignors to Farbwerk Hoechst Aktiengesellschaft vormals Meister Lucius & Bruning, Frankfurt am Main, Germany, a corporation of Germany
No Drawing. Continuation-in-part of application Ser. No. 327,118, Nov. 29, 1963. This application Nov. 17, 1965, Ser. No. 508,395
Claims priority, application Germany, Nov. 30, 1962, F 38,429
9 Claims. (Cl. 260—67)

This application is a continuation-in-part of application Ser. No. 327,118 filed Nov. 29, 1963.

The present invention relatese to new copolyacetals of trioxane, a cyclic ether and/or a cyclic formal, and a bifunctional diglycidyl compound, particularly an ether thereof or an ether of an aliphatic or cycloaliphatic diol, and to a process for making them.

It is known that polyoxymethylenes of high molecular weight which are suitable for the manufacture of plastics can be obtained by anionic polymerization of formaldehyde or cationic polymerization of trioxane, the cyclic trimer of formaldehyde. High-polymer polyoxymethylene constitutes a polyactal with unstable terminal hemiformal groups. It is thermally decomposed, except for a small proportion, by a so-called unzipping reaction in which monomeric formaldehyde is formed. In this reaction, a new unstable terminal hemiformal group is formed at the macromolecule on the degradation of a hemiformal molecule.

To convert such polyoxymethylene with terminal hemiformal groups into technically useful plastics it is necessary to stabilize the terminal groups. For this purpose, the terminal groups may, for example, be esterified at 160° C. with acetic anhydride. After esterification, the excess of acetic anhydride and the acetic acid formed must be removed from the polymer by complicated purifying processes. Moreover, the polymers thus stabilized are unstable toward alkali since they are saponified by them. Furthermore, when a molecular chain which has been stabilized by esterification of the terminal groups is thermally split in the interior part of the chain, an unzipping reaction sets in.

The latter applies also to products with etherified terminal groups. When the terminal groups are etherified, moreover, it is difficult to adjust the polymer to a desired molecular weight. More favorable results in the stabilization of polyoxymethylenes are obtained by copolymerizing trioxane, for example, with saturated cyclic ethers or cyclic formals such as ethylene oxide or diethylene glycol formal.

To stabilize the polymers, the unstable terminal groups are decomposed by hydrolysis after the polymerization, the unzipping reaction stopping at the comonomer molecules.

When a molecule chain is thermally split in the processing of the polymer, the decomposition of the chain stops at the next comonomer molecule so that the said copolymers have a much better thermostability than homopolymers of oxymethylene.

As catalysts for the manufacture of the above mentioned copolymers, boron fluoride or its derivatives, for example etherates, or diazonium fluoroborates are advantageously used.

Copolymers of acetals, particularly copolymers having a high content of polyoxymethylene units of high molecular weight and high stability, are successfully used for the manufacture of injection molded articles which may be used, for example, at elevated temperatures. High molecular weight polymers of the said type that can be used for extrusion processes can be obtained by the known process only with great difficulty and only with the use of extremely pure trioxane.

Now we have found that terpolymers which are distinguished by particularly valuable properties, for example, a high molecular weight and good mechanical properties, can be obtained by copolymerizing under conditions commonly used for the production of trioxane copolymers, (A) trioxane, (B) a cyclic ether and/or a cyclic formal of the formula

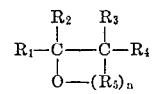

wherein each of $R_1$, $R_2$, $R_3$, and $R_4$, represents a hydrogen atom or a lower alkyl radical which may be substituted by halogen, preferably at least two of these ($R_1$–$R_4$) being hydrogen atoms, $R_5$ stands for methylene, oxymethylene, alkyl or haloalkyl substituted methylene, or alkyl or haloalkyl substituted oxymethylene, and $n$ is zero or an integer of 1 to 3, and (C) a bifunctional compound such as diglycide of the formula

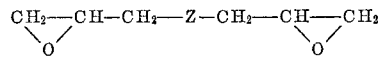

wherein Z represents a carbon-to-carbon bond, and oxygen atom, an oxy-alkoxy of up to 8 carbon atoms, preferably 2 to 4 carbon atoms, and which may be an oxycycloalkoxy of 4 to 8 carbon atoms, and an oxy-poly (lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

As cyclic ethers (B) of the above formula there may advantageously be used, for example, ethylene oxide, dioxolane, and diethylene glycol formal. There may also be used dioxane, trimethylene oxide, tetramethylene oxide, pentamethylene oxide, 1,2-propylene oxide, 1,2-butylene oxide, 1,3-butylene oxide, 2,2-di-(chloromethyl)-1,3-propylene oxide. As the bifunctional compound (C) are preferably used diglycidyl ethers of ethylene glycol, 1,4-butane-diol, 1,3-butane diol, cyclobutane-1,3-diol, 1,2-propane-diol. Further suitable compounds are the diglycidyl ethers of cyclohexane-1,4-diol and 2-dimethyl-4-dimethyl-cyclobutane-1,3-diol.

By copolymerizing according to the process of the invention the components trioxane, (A), cyclic ether and/or cyclic formal, (B), and one or more of the above mentioned bifunctional compounds, (C), for example, diglycidyl ether, particularly a diether of 2 mols of glycide and 1 mole of an aliphatic diol with 2 to 4 carbon atoms, in a ratio of 99.89 to 89.0% by weight of trioxane, 0.1 to 10% by weight of the cyclic ether and 0.01 to 1% by weight of the bifunctional compound, the percentage figures being calculated on the weight of the total mixture, terpolymers are obtained which are distinguished, in addition to the other properties already mentioned, particularly by the fact of being colorless and by a particularly good extrudability, a processing property very desired in practice. The products are particularly valuable owing to their high molecular weight which is characterized by a melt index within the range of 0.1 to 2.0, determined according to ASTM-D1238-52T.

Another advantage of the process of the invention over known processes is that it enables high molecular weight products of low melt index to be obtained even with the use of less pure trioxane whereas in known processes when such trioxane is used as a starting material without the addition of the bifunctional compound, (C), in accordance with the invention, only copolymers having a melt index above 2.0 are obtained.

The polymerization may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers. The polymerization in substance takes a particularly smooth course.

In some cases it may be advantageous to use the following quantitative proportions: 99.85 to 89.5% by weight of trioxane, 0.1 to 10% by weight of cyclic ether or cyclic formal, and 0.05 to 0.5% by weight of diglycidyl ether, the percentage figures being calculated on the total weight of the monomer mixture.

The molecular weight may be adjusted by means of acetals, for example, formaldehyde dimethyl acetal.

The polymerization is advantageously carried out at temperatures at which trioxane does not crystallize out, that is, at a temperature within the range of −50° to +100° C. depending on the solvent used, and in the absence of a solvent at a temperature within the range of +20° to +100° C.

As catalysts, all substances may be used which are capable of initiating a cationic polymerization, for example, organic or inorganic acids, acid halides and advantageously Lewis acids. Of the latter, boron fluoride and its complex compounds, for example, etherates of boron fluoride, are advantageously used. Diazonium fluoroborates are particularly advantageous.

The concentration of the catalyst may vary within wide limits depending on the nature of the catalyst and on the intended molecular weight of the terpolymer. The concentration of the catalyst may be within the range of 0.0001 to 1% by weight, calculated on the total monomer mixture, and is advantageously within the range of 0.001 to 0.1% by weight.

Since the catalysts to be used in the process of the invention tend to decompose the polymer, the catalyst is advantageously neutralized immediately after the polymerization, for example, with ammonia or methanolic or acetonic amine solutions.

The unstable terminal hemiacetal groups may be removed in the manner known for other copolymers. Advantageously, the polymer is suspended in aqueous ammonia at temperatures within the range of 100° to 200° C., and if desired in the presence of a swelling agent such as methanol or n-propanol. Alternatively, the polymer is dissolved in an alkaline medium at temperatures above 100° C. and subsequently reprecipitated. Examples of suitable solvents are benzyl alcohol, ethylene glycol monoethyl ether or a mixture of 60% methanol and 40% water. Examples of suitable compounds having an alkaline reaction are ammonia and aliphatic amines.

It is also possible to stabilize thermally the terminal groups in the absence of a solvent in the melt in the presence of a stabilizer.

The polymer may be stabilized against the action of heat, light and oxygen in the same manner as the known trioxane copolymers. Exemplary of heat stabilizers are polyamides, amides of polybasic carboxylic acids, amidines and urea compounds. Exemplary of stabilizers against oxidation are phenols, advantageously bisphenols and aromatic amines. As light stabilizers, alpha-oxybenzophenone derivatives may be used.

The terpolymers of the invention are particularly suitable for the manufacture of films and fibers, especially by the extrusion process, and for the manufacture of hollow articles, especially by the blow molding process. They may further advantageously be used for making profiles, molded articles and injection articles.

The following examples serve to illustrate the invention, but are not intended to limit it.

In the examples, the viscosity values are indicated in $\eta_{red}$, the value $\eta_{red}$ being determined at 140° C. in a 0.5% solution of the polymer in butyrolactone stabilized with 2% of diphenylamine.

Example 1

1000 grams of trioxane, 20 grams of ethylene oxide and 1 gram of ethylene glycol diglycidyl ether were mixed at about 80° C. in a flask. In the mixture so obtained, 160 milligrams para-nitrophenyl diazonium fluoroborate were dissolved. The monomer mixture containing the catalyst was introduced into a mold of refined steel which had been purged with nitrogen and was placed on a water bath at 70° C. The reaction temperature was measured with a thermo-element. The temperature in the block rose to about 100° C. and then decreased again. After one hour the mold was chilled in cold water and the block was withdrawn and ground.

The polymer was boiled with methanol containing 1% of triethanolamine, washed with methanol and dried. It was then subjected to a heterogenous hydrolysis in a 1% ammonia solution in a ratio of 1:4. The hydrolysis temperature was 144° C. and the pressure was 3.7 atmosphere gauge. The product was then washed again and dried. The melt index was 2.18.

Example 2

879 cc. liquid trioxane were mixed with 20 cc. ethylene oxide and 1 cc. 1,4-butane-diol-diglycidyl ether. 160 milligrams of para-nitrophenyl diazonium fluoroborate were dissolved in the monomer mixture and the mixture was then polymerized in a mold of refined steel. In the manner described in Example 1, the polymer was treated with a 1% solution of triethanolamine in methanol, washed with methanol and dried. The polymers obtained by 10 batches with an average extent of conversion of 85% were subjected in a 70-liter vessel for 30 minutes at 141° C. to a heterogeneous hydrolysis in a ratio of 1:5 in an aqueous ammonia solution of 1% strength containing 10% of methanol. In the hydrolysis, the product lost 10% of its weight. The polymer had a pure white color. The melt index was 0.16.

The loss in weight of a product which had been stabilized with 10 milligrams of dicyandiamide and 35 milligrams of 2,2-methylene-bis-4-methyl-6-tert. butylphenol for each 5 grams of polymer was 0.026% per minute when the product was treated for 45 minutes at 230° C. in an air atmosphere.

Example 3

100 grams of trioxane, 3 grams of dioxolane and 0.1 gram of 1,3-butane-diol-diglycidyl ether were polymerized at 70° C. with 10 milligrams of para-nitrodiazonium fluoroborate as a catalyst. The polymer was worked up and hydrolyzed as described in Example 1. The pure white polymer had a value $\eta_{red}$ of 0.88. The melt index was 0.80.

Example 4

4 cc. of diethylene glycol formal and 0.1 cc. of 1,4-butane-diol-diglycidyl ether were mixed with 96 cc. of liquid trioxane in a screw-top glass bottle and then 0.02 cc. of boron fluoride diethyl etherate was added as a catalyst from a finely graduated injection syringe. The polymerization was carried out at 70° C. in a constant temperature bath. The polymer was hydrolyzed as described in Example 2. The melt index was 1.06.

Example 5

100 grams of freshly distilled trioxane, 2 grams of ethylene oxide and 0.5 gram of diglycidyl ether were polymerized in the presence of 0.1 cc. of methylal as a regulator and 10 milligrams of para-nitrophenyl diazonium fluoroborate as a catalyst at an initial temperature of 70° C. in a screw-top glass bottle.

After polymerization the block of product was disintegrated and ground and subsequently subjected for 30 minutes at 150° C. to a homogeneous hydrolysis in 1 liter of benzyl alcohol in the presence of 10 cc. of triethanolamine. After hydrolysis, the polymer was precipitated with methanol, suction-filtered, boiled with methanol, washed and dried. The melt index was 0.9 and the tenfold melt index (obtained by replacing the weight of 2.16 kilograms by a weight of 21.6 kilograms) was 20.6.

Example 6

Freshly distilled trioxane to which 2% by weight of ethylene oxide, 0.05% by weight of 1,4-butane-diol-diglycidyl ether and 150 p.p.m of methylal had been added was polymerized in a Ko-kneader with the use of 80 p.p.m of boron fluoride dibutyl etherate as a catalyst. The extent of conversion was 91%.

The product was hydrolyzed as described in Example 1 with a loss in weight during hydrolysis of 8%. The melt index was 1.5. The loss in weight examined in the manner described in Example 2 was 0.017% per minute.

Example 7

Freshly distilled trioxane containing 2% by weight of ethylene oxide and 0.2% by weight of diglycidyl ether was pumped from a heated storage vessel having a nitrogen atmosphere into a Ko-kneader into which was injected a solution of boron trifluoride dibutyl ether in cyclohexane (1:80) so the concentration of BF₃ in the monomer solution was 80 p.p.m. Crude polymer falling from the Ko-kneader was immediately pulverized in a mill, and the resulting grains were hydrolyzed in an aqueous ammonia (10%) solution containing water and ammonia in a ratio of 1:5 at 192° C. and 3.5 atmospheres gauge. The product was then washed and dried, and had a melt index of 0.6 (ASTM–D 1238-52 T). Treating in air at 230° C. for 45 minutes caused the product, stabilized with 10 mgms. of dicyanodiamide and 35 mgms. of 2,2-methylene-(bis)-4-methyl-6-tret.-butyl phenol per 5 gms. of polymer, to lose 0.014% per minute of its weight.

Example 8

Freshly distilled trioxane containing 2% by weight of ethylene oxide and 0.3% by weight of 1,3-butane-diol-diglycidyl ether was polymerized as described in Example 7. The crude polymer was extruded into a 1% aqueous ammonia solution, ground while wet, and hydrolyzed as described in Example 7. The melt index of the product was 0.5. A sample of crude product dry pulverized in a mill and hydrolyzed as described in Example 7 had a melt index of 2.3.

Other glycides of particular interest polymerizable by the methods illustrated in the preceding examples include

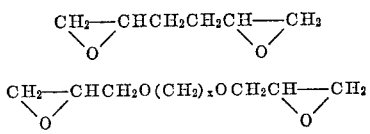

wherein $x$ is 1, 3, 5 or 6, and

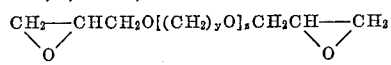

wherein $y$ is 1 or 2 and $z$ is 2, 3 or 4.

We claim:
1. A copolyacetal comprising the terpolymerization product of (A) 99.89% to 89% of trioxane, (B) 0.1% to 10% of a compound of the formula

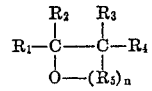

wherein each of $R_1$, $R_2$, $R_3$ and $R_4$ is a hydrogen, a lower alkyl or a halogen-substituted lower alkyl, $R_5$ is a methylene, an oxymethylene, a lower alkyl or halo-lower alkyl substituted methylene, or a lower alkyl or halo-lower alkyl substituted oxymethylene, and $n$ is an integer of 0 to 3, and (C) 0.01% to 1% of a diglycide of the formula

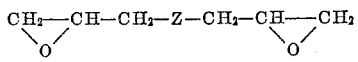

wherein Z is a carbon-to-carbon bond, an oxygen a oxy-alkoxy of 1 to 8 carbon atoms or an oxy-poly(lower alkoxy), said percentages being by weight calculated on the total weight of said (A), (B) and (C) components.

2. A copolyacetal as defined in claim 1 wherein Z is an oxy-alkoxy of 2 to 4 carbon atoms.
3. A copolyacetal as defined in claim 1 wherein Z is oxy-ethoxy.
4. A copolyacetal as defined in claim 1 wherein Z is 4-oxy-butoxy.
5. A copolyacetal as defined in claim 1 wherein Z is 3-oxy-butoxy.
6. A copolyacetal as defined in claim 1 wherein said (B) is ethylene oxide.
7. A copolyacetal as defined in claim 1 wherein said (B) is dioxolane.
8. A copolyacetal as defined in claim 1 wherein said (B) is diethylene glycol formal.
9. A copolyacetal as defined in claim 1 wherein Z is oxygen.

References Cited

UNITED STATES PATENTS

| | | | |
|---|---|---|---|
| 3,058,921 | 10/1962 | Pannell | 260—2 |
| 3,275,604 | 9/1966 | Kray et al. | 260—67 |
| 3,027,352 | 3/1962 | Walling et al. | 260—67 |
| 3,033,803 | 5/1962 | Price et al. | 260—2 |
| 3,278,460 | 10/1966 | Auerbach et al. | |
| 3,293,219 | 12/1966 | Gottesman et al. | |

FOREIGN PATENTS 1,271,297  7/1961  France.

WILLIAM H. SHORT, *Primary Examiner.*

L. M. PHYNES, *Assistant Examiner.*